United States Patent [19]
Wickizer

[11] Patent Number: 6,095,784
[45] Date of Patent: Aug. 1, 2000

[54] REPAIR DEVICE FOR DAMAGED SHAFTS OR JOURNALS

[76] Inventor: Antonio R. Wickizer, Rte. 4, Box 190, Dillwyn, Va. 23936

[21] Appl. No.: 09/181,170

[22] Filed: Oct. 28, 1998

Related U.S. Application Data

[60] Provisional application No. 60/063,661, Oct. 28, 1997.
[51] Int. Cl.[7] .................................... B29C 73/00
[52] U.S. Cl. .................. 425/11; 249/90; 425/13; 425/14
[58] Field of Search ................. 425/11, 13, 14, 425/108, 110, 117; 249/88, 90; 264/36; 138/99

[56] References Cited

U.S. PATENT DOCUMENTS

| | | | |
|---|---|---|---|
| 3,584,353 | 6/1971 | Smith | 138/99 |
| 4,459,251 | 7/1984 | Eldridge et al. | 249/90 |
| 4,889,167 | 12/1989 | Morris | 138/99 |
| 5,383,496 | 1/1995 | Bridges et al. | 138/99 |

*Primary Examiner*—James P. Mackey
*Attorney, Agent, or Firm*—Dougherty & Associates

[57] ABSTRACT

The present invention includes an apparatus and method for in situ repair of damaged bearing surfaces of shafts or journals. The apparatus consists of a bracket assembly supporting a forming material axially aligned with and sized to the damaged shaft or journal. The former stock is self-sizing to the diameter of the damaged shaft or journal encountered. After cure of the repair material used with the invention, a new surface is created, which is then ready to accept a replacement bearing. The apparatus is reusable for subsequent repair needs.

4 Claims, 3 Drawing Sheets

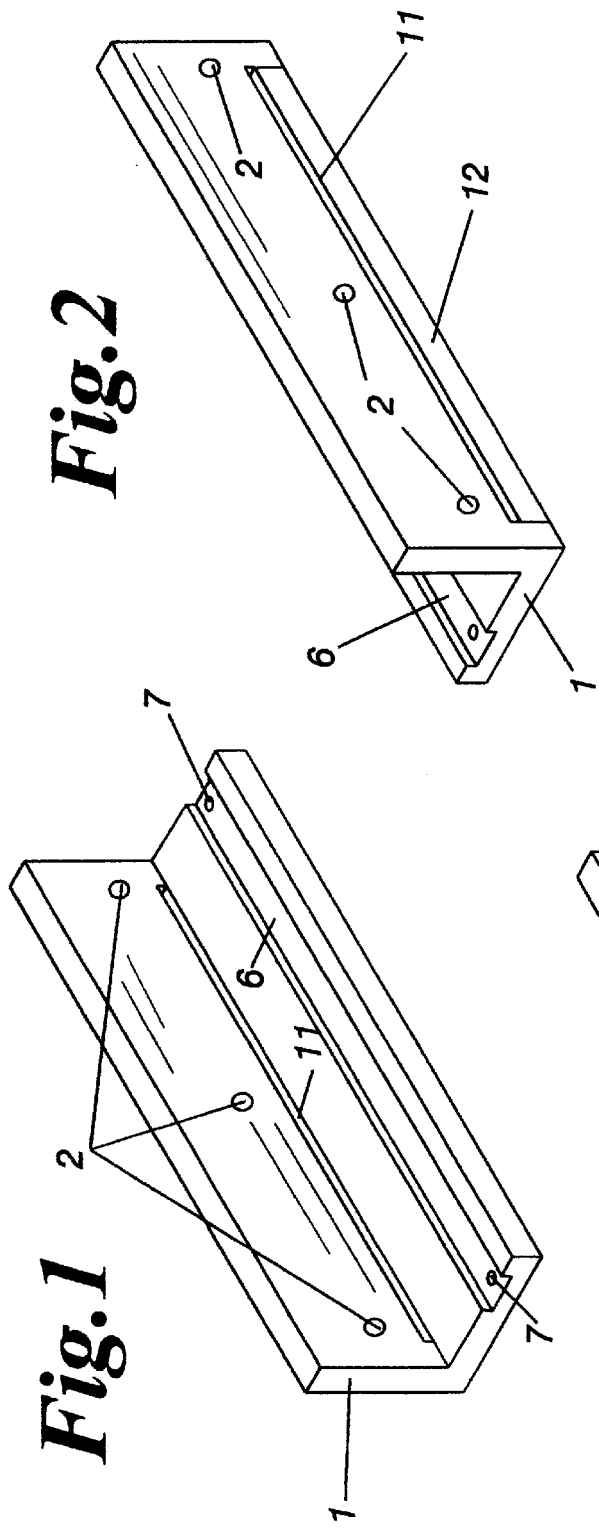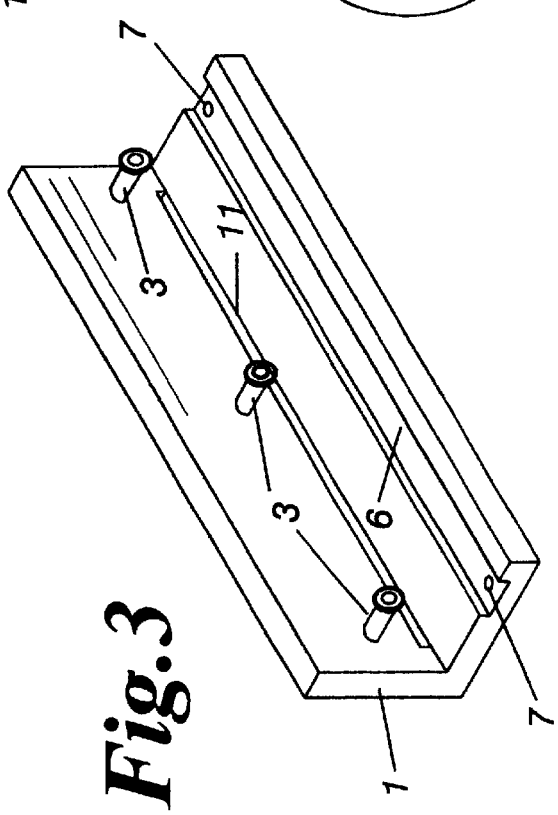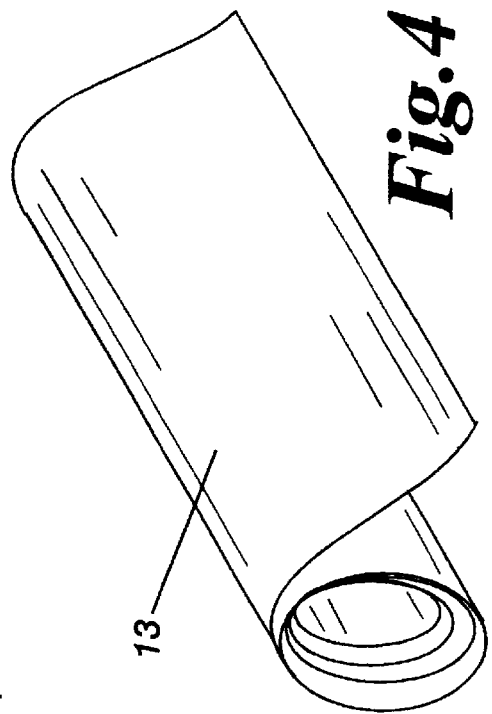

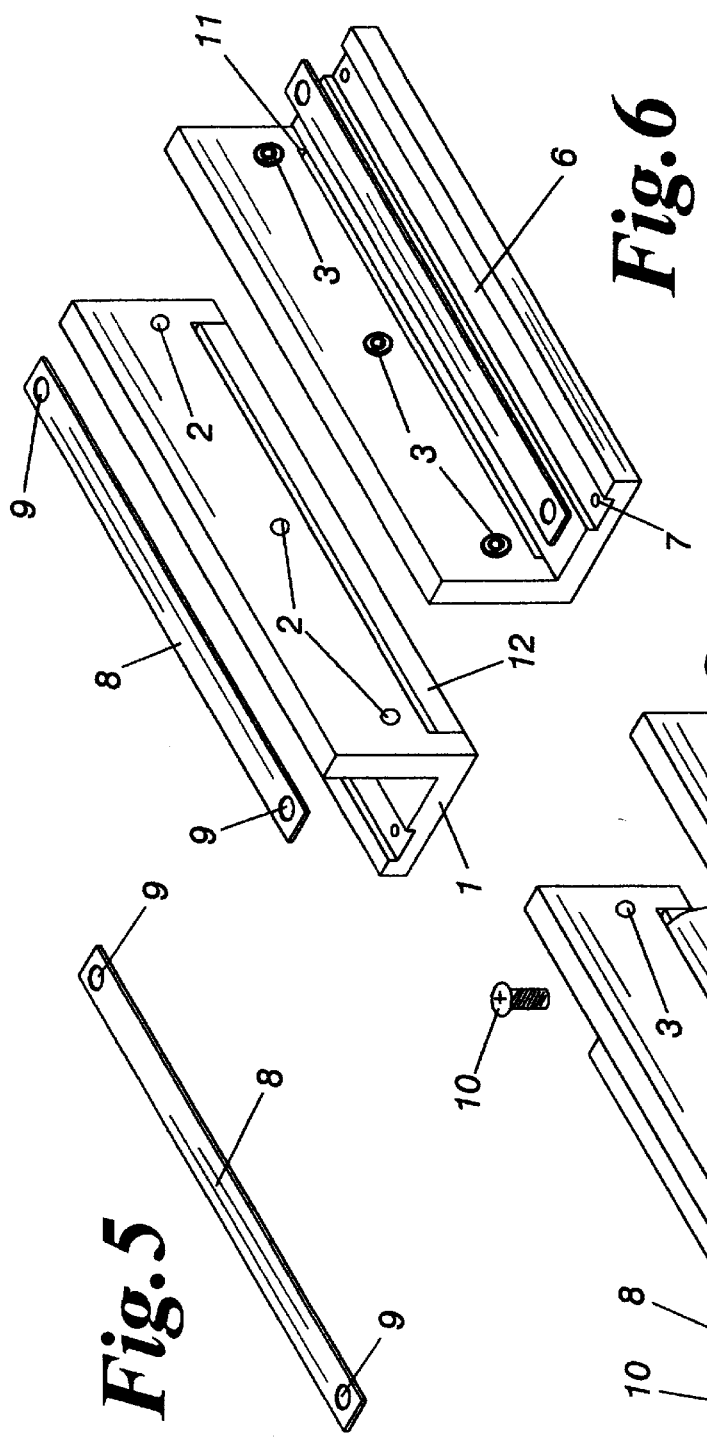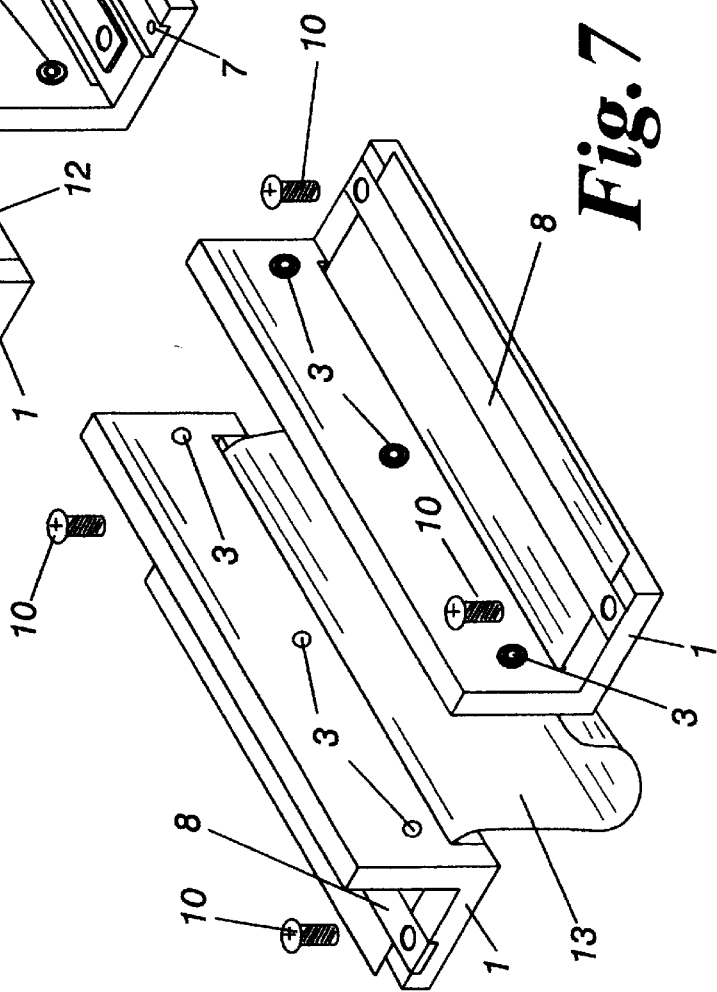

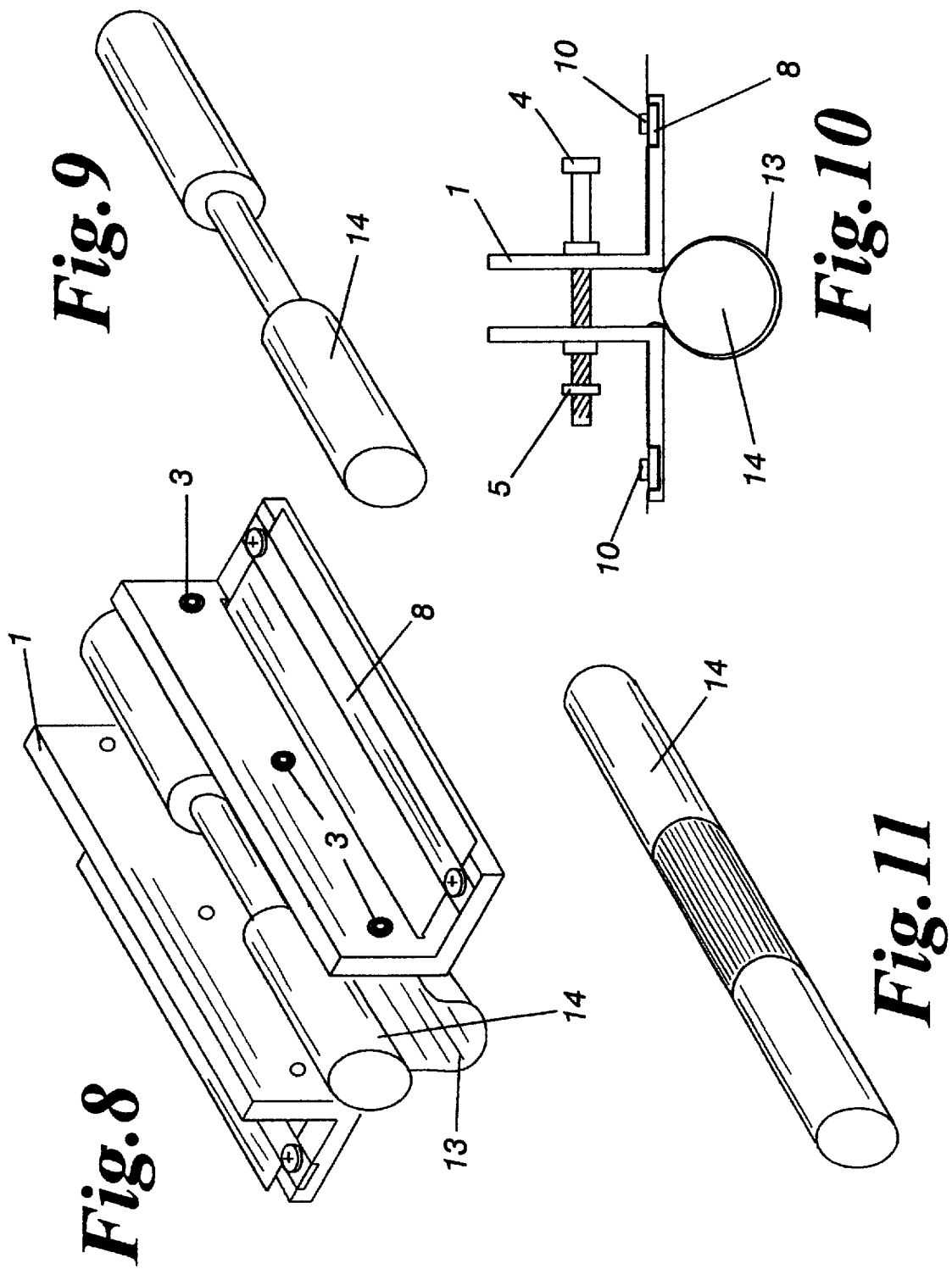

6,095,784

REPAIR DEVICE FOR DAMAGED SHAFTS OR JOURNALS

CROSS-REFERENCE TO RELATED APPLICATION NUMBER 60/063,661.

This application claims the benefit of U.S. Provisional Application Serial No. 60/063,661, filed on Oct. 28, 1997.

BACKGROUND

1. Field of Invention

This invention relates to a device and a method for shaft or journal repair, specifically to such shafts or journals damaged by seizure of the bearings supporting them.

2. Description of Prior Art

Bearings that support shafts or journals routinely fail. This mechanical failure frequently scores or otherwise damages the surface of said shafts or journals to the extent that a replacement bearing will not fit the shaft or journal properly. Repairing the damaged area or replacing the shaft or journal is necessary to reestablish the necessary fit. Often the decision is made to try a repair because of the unavailability of a replacement shaft or journal, or in some cases because of the cost of the replacement. The present method of repairing shafts and journals consists of machining the damaged area, often in place, and installing a "sleeve" over the damage. This sleeve is itself then machined to obtain, as nearly as possible, the original dimensions of the damaged area. In some cases the damaged shaft or journal is removed to a machine shop for this procedure. In either case, repair or replacement, the costs are significant and the time involved can be quite long, sometimes days. The result is a loss of operation of the shaft or journal that can be costly in terms of lost production or efficiency.

A method of effecting an in-place repair using a forming device has been known in the art for some time, but it involves machining a former for each particular repair. This is inherently inefficient, as a former must be manufactured for each instance of damage, and is thereafter of use only on an area of like damage. A problem also arises with these formers often being machined improperly, and the subsequent repairs failing after a short time in service.

U.S. Pat. No. 4,936,005 to Dziurowitz (1990) discloses a clamping apparatus which can repair a damaged surface as described above, but does not consider the surface necessary for the reassembly of a bearing. U.S. Pat. No. 4,781,496 to Schuchman (1988) shows a means of resurfacing a housing, but does not address the shaft or journal itself.

A variety of other U.S. Patents attempt to address various repairs to pipes, poles, joints, couplings, and hoses. Among them, U.S. Pat. No. 5,337,469 to Richey (1994); U.S. Pat. No. 4,585,091 to Budd (1986); U.S. Pat. No. 4,358,417 to Beinhauer (1982); U.S. Pat. No. 4,268,070 to Adams (1981); U.S. Pat. No. 4,175,311 to Bunyan (1979); U.S. Pat. No. 3,491,182 to Hunder et al. ((1965); U.S. Pat. No. 2,586,640 to Furman (1947); U.S. Pat. No. 1,619,287 to Charter (1923); U.S. Pat. No. 1,445,858 to Tallman (1922); and U.S. Pat. No. 697,262 to Marcy (1902). All of these repair methods suffer from two key disadvantages:

(a) When employed as directed, they do not allow for the necessary installation of a new bearing as required by the shaft or journal.

(b) As with the manufactured formers discussed earlier, most are used for a singular application, and lost to subsequent use.

OBJECTS AND ADVANTAGES

Accordingly, several objects and advantages of the present invention are:

(a) to provide a device which is immediately sizeable to virtually any diameter shaft or journal encountered;

(b) to provide a device which is re-useable after each repair encounter;

(c) to provide a repair which is the same size as the undamaged portion of the shaft or journal;

(d) to provide a repair which is perfectly aligned with the original axial orientation of the shaft or journal being repaired;

(e) to allow for timely return to service of the repaired shaft or journal, often less than one hour from the start of the repair;

(f) to provide for the in situ repair of damaged shafts or journals encountered;

(g) to provide a repair surface which is consistent in feel and appearance of the undamaged portion of the shaft or journal.

A further object and advantage is to provide a system which is adaptable to nearly all cylindrical objects for repair, regardless of rigidity or density. An example would be a rubber coated calendar roll in the printing or pulp and paper industries which has been gouged or damaged by an external object. Still further objects and advantages will become apparent from a consideration of the ensuing description and drawings.

DESCRIPTION OF THE DRAWINGS

FIG. 1 is a perspective drawing of the front of the bracket with the integral alignment holes, slots and grooves depicted.

FIG. 2 is a perspective drawing of the back of the bracket depicting the integral lower recessed face of the bracket.

FIG. 3 is a depiction of the front of the bracket with the integral protective bushings oriented for installation.

FIG. 4 is a perspective depiction of the forming stock used in the repair procedures.

FIG. 5 is a perspective depiction of the clamping strap which holds and supports the forming stock.

FIG. 6 is a depiction of the bracket pair as seen before assembly for use.

FIG. 7 is a perspective depiction of the nearly assembled apparatus as would be seen prior to installation on a shaft or journal.

FIG. 8 is another depiction of the apparatus during mounting on the shaft or journal.

FIG. 9 is a representation of a damaged shaft or journal member.

FIG. 10 is an end view of the apparatus in place prior to final fitting on the shaft or journal FIG. 11 is a depiction of the repaired shaft or journal member.

DETAILED DESCRIPTION

A right hand perspective of the small size of the device is shown in FIG. 1. The bracket 1 is made from a strong, rigid angular material, in this embodiment structural aluminum, 2.0 inches high×2.0 inches wide×0.375 inches thick×7.5 inches long. Three holes 2 are drilled with the centerline of the holes 2 at half the height of the bracket 1, the center hole 2 being midway of the length of the bracket 1, and the two outer holes 2 located 0.75 inches from the outer edge of the bracket 1. The holes 2 are drilled with a 7.9-millimeter drill to accommodate the insertion of 0.312 inch diameter×0.375 inch long shoulder bushings 3 (FIG. 3). The bushings 3 protect the holes 2 from the 1.5-inch×¼-20 socket head screws 4 (FIG. 10), when the assembled apparatus is used and are replaceable as needed. The holes 2 pass through the bracket 1 and align with another bracket 1 when placed back to back as when in use. The lower inner face of the bracket 1 embodies a channel 6 0.625 inches wide and 0.125 inches deep along its entire length. Along the centerline of the channel 6 and 0.375 inches on center from each end of the bracket 1 is drilled a hole 7, using a size of drill as to accommodate tapping the hole 7 with ¼-20 threads. A 0.5 inch wide×0.125 inch thick metal clamp strap 8 (FIG. 6) is manufactured to the length of the bracket 1 and drilled with holes 9 to correspond to the holes 7 in the lower face of the bracket 1. The holes 9 are drilled large enough to allow free insertion of the 0.5 "×¼-20 socket head cap screws 10 (FIG. 7) through the clamp strap 8 and into the bracket 1, thereby affixing the clamp strap 8 to the bracket 1 when the device is in use. Referring to FIG. 2, a slot 11, nominally 0.125 inches in height, is milled along the length of the bracket 1, its lower edge being in alignment with the top of the lower inner face of the bracket 1, and extending to within 0.75 inches of the ends of the bracket 1. The lower rear face 12 of the bracket 1 is milled to a depth of 0.005" to accommodate the thickness of the former stock 13 (FIG. 4) when the apparatus is in use for repairs. In this embodiment the former stock 13 (FIG. 4) is a thin stainless steel sheet of a width to accommodate the width of the slot 11 (FIG. 2) in the bracket 1. The lower rear face 12 is located below the slot 11 and corresponds to the length of the slot 11. This allows for the apparatus to be very intimately and very accurately affixed to the shaft or journal or coated roll 14 (FIG. 10) to be repaired. The holes 2 (FIG. 8) allow the screws 4 (FIG. 10) to affix two brackets I together after assembly to the forming stock 13 and when mounted on the shaft or journal or coated roll 14 (FIG. 10) to be repaired. FIG. 9 represents a shaft or journal or coated roll 14 which has been damaged by any of a variety of means which could include the seizure of a bearing (not shown) on the surface of the shaft or journal 14, or the abrasion of the coated roll 14 by general wear or by contact with a foreign object (not shown), and subsequently prepared for the repair procedure described below.

To begin the repair procedure, the shaft or journal or coated roll 14 is manually or mechanically undercut and abraded to allow for mechanical bonding of commercially available polymer repair products (not shown).

Referring to FIG. 7, after proper surface preparation of the area to be repaired, the socket head clamp strap screws 10 are loosened to allow free vertical movement of the straps 8. The two brackets 1 are positioned back-to-back and held upside down (not shown) to allow insertion of the forming stock 13 under the clamp strap 8, through the slots 11, and under the opposing clamp strap 8. After righting the assembled apparatus, the clamp strap screws 10 are tightened to secure the forming stock 13 to the outermost bracket 1. The innermost bracket 1 is now free to slide along the captive forming stock 13. Still referring to FIG. 8, the assembled apparatus is now introduced to the shaft or journal or coated roll 14 needing repair by positioning the apparatus under the shaft or journal or coated roll 14 and moving the brackets 1 away from each other, following the circumference of the shaft or journal or coated roll 14 until the brackets 1 are positioned near the top of the shaft or journal or coated roll 14. Referring to FIG. 10, a 1.5"×¼-20 socket head screw 4 is assembled through the center nylon bushings 3 of both brackets 1 and loosely secured with a ¼-20 wing nut 5. Additional screws 4 are similarly assembled in the remaining bushings 3. The forming stock 13 is pulled tight through the slot 11 and under the clamp strap 8 of the inner bracket I until all slack is removed and the forming stock 13 generally follows the contour of the shaft or journal or coated roll 14 to be repaired. The 0.5"×¼-20 socket head clamp strap screws 10 are then hand tightened only, to provide resistance in the ensuing step. The 1.5"×¼-20 socket head screws 4 are now tightened, forcing the backs of the brackets 1 together, while maintaining contact with the shaft or journal or coated roll 14. This procedure insures that the apparatus is perfectly sized to the diameter of the shaft or journal or coated roll 14 being repaired. Once the brackets 1 are in firm contact, the clamp strap screws 10 on the innermost bracket 1 are mechanically securely tightened to maintain the proper fit. A correctly sized former has now been created without the need for measuring, and with the assurance of a perfect size and centered alignment. The excess amount of the forming stock 13 is now trimmed away from the edge of the innermost bracket 1. The screws 4 are now loosened, and the apparatus removed. Several weep holes (not shown) are punched along the centerline of the forming stock 13 to allow relief of excess material in the ensuing steps. A lubricant or release agent (not shown) is applied to all of the exposed surfaces of the brackets I and to the forming stock 13 to minimize the adherence of the repair material and to facilitate removal of the repair material after the repair has been completed. A detail of the completed assembly is shown in FIG. 10.

A commercially available polymer repair product such as Belzona® Super Metal or Devcon Titanium Putty (not shown) is mixed and applied proud to the prepared surface of the shaft or journal or coated roll 14. Alternatively, the material may be injected into the assembly by means of a hole manually punched in the forming stock 13 (not shown).

Referring to FIG. 8, the brackets 1 and the inner surface of the forming stock 13 are rested on the shaft or journal or coated roll 14 in such a manner as to bridge the worn or damaged area and to rest on undamaged portions of the shaft or journal or coated roll 14. The strength and flexibility characteristics of the forming stock 13, when clamped securely in the brackets 1 by the clamp straps 8 are such that a perfectly aligned and properly sized mold is formed around the damaged area of the shaft or journal or coated roll 14.

FIG. 8 depicts the proper orientation of the brackets 1 and the forming stock 13 with a shaft or journal or coated roll 14 in place and prior to inserting and tightening the center screw 4 and wing nut 5.

FIG. 10 is a side view of the shaft or journal or coated roll 14 about to be repaired with the apparatus in place. The brackets 1 are positioned such that the lower faces 12 of the brackets 1 will intimately abut each other upon tightening of the bolts 4 and the wing nuts 5, reforming the worn area of the shaft or journal or coated roll 14 to it original dimension with the repair polymer (not shown) chosen Excess material will extrude from the aforementioned holes in the forming stock 13.

The repair material is allowed to cure. This process may be accelerated by the rid application of external heat for approximately 30 minutes. This acceleration step is desirable when the time of the repair is of great concern. After cure of the repair material, and upon removal of the brackets 1, a small amount of manual finishing may be required (not shown) to remove excess repair material at the point where the lower faces 12 of the brackets 1 met at the shaft or journal or coated roll 14. This step is generally not necessary when material is injected into an already formed and positioned apparatus (not shown).

FIG. 5 depicts a clamp strap 8 and the holes 9 which allow attachment to the apparatus.

FIG. 11 represents the completed repairs to the shaft or journal or coated rolls 14 described throughout.

After removal from the shaft or journal or coated roll, the entire repair assembly (FIG. 6) may be cleaned of any adhering repair material because of having previously coated the repair assembly with a release agent or lubricant, and stored for later use on another repair.

SUMMARY, RAMIFICATIONS AND SCOPE OF THE INVENTION

The shaft or journal or coated roll repair and/or rebuilding apparatus of the present invention has been designed to facilitate in situ, or in place repairs to those shafts or journals suffering damage from a variety of sources, among them bearing failure, or coated rolls that are damaged by, among other things, wear or abrasion or environmental attack, that would otherwise require replacement or utilization of a repair procedure the requires machining. Conventional repairs using a rigid former dictate that it be manufactured specifically for each size of shaft or journal or coated roll encountered. As previously mentioned, another alternative is the replacement of the component. All of these presently available solutions are costly and time consuming. Typical repairs can take many hours, days, or even weeks, due to the lack of parts availability, or readily available machining capability. Moreover, a significant loss of productivity is suffered by utilizing any of these aforementioned repair or replacement procedures. This invention allows for the adaptation of a properly centered and aligned variable former which, when used with a modern repair polymer, such as Belzona® Super Metal, Devcon Titanium Putty, or other similar and commercially available products, allows for a permanent repair in a very short period of time, often in as little as one hour. This invention is inherently adaptable to virtually any diameter shaft or journal or coated roll, is sized to the repair at hand in mere minutes, and is re-useable.

The basic apparatus is to be manufactured, for stocking purposes, in six-inch and twelveinch versions, which will accommodate most repair needs. The length descriptor, i.e., six inch or twelve inch, refers to the longitudinal length of surface generally repairable, and which has been damaged by the inner race of a bearing, plus some excess from movement of the aforementioned inner race. Custom lengths can be manufactured to specification in a very short time without the need for retooling. The six-inch apparatus will accommodate perhaps ninety percent of the shafts or journals in use now, which may require repair or rebuilding. By utilizing multiple combinations of the six-inch device along with the twelve-inch device, shaft or journal or coated roll damage of unlimited length can be repaired with little problem. Additionally, this apparatus can be custom manufactured for any size larger than currently anticipated.

As part of its design, by using the unworn portion of the shaft or journal or coated roll as a centering aid, and as a partner in forming the apparatus to the size necessary to make a proper repair, extremely accurate sizing and alignment are achieved. Further, in a situation wherein the undamaged area of the shaft or journal or coated roll is available only on one side of the damage, as with damage on the end of a shaft or journal or coated roll, repairs may be made by using only one bearing point on the shaft or journal or coated roll while the free end is formed to proper size by means of a dummy insert or disk of the proper diameter (not shown) held to the end of the damaged shaft or journal or roll while the invention is being attached. This device will produce consistently acceptable results that should be considered a permanent repair, as though replacement with new components had been effected, but for considerably less cost, and with far less down time.

The description above contains many specificities, but these should not be construed as limiting the scope of the invention. Instead, they are merely providing illustrations of some of the presently preferred embodiments of this invention. For example, the apparatus could have different shapes and sizes to accommodate use in severely confined areas; an inclined adapter could be used between the base of the apparatus and the forming stock to accommodate tapered shafts and journals; the former stock could be of a material to accommodate specific texture requirements, etc.

Thus the scope of the invention should be determined by the appended claims and their legal equivalents, rather than by the examples given.

I claim:

1. A repair apparatus to effect in situ repairs of a damaged portion of a bearing surface of a shaft or journal, the apparatus comprising:

an assembly of two brackets, each bracket having a back and a bottom edge, the backs of the brackets confronting each other, each bracket including a narrow slot therein;

a flexible former material extending through both of the slots of the brackets, the former material having sufficient width to overlap the damaged portion of the shaft or journal;

clamping means for securing the former material to each bracket such that the length of the former material extending between the brackets may be adjusted to conform to the diameter of the shaft or journal being repaired, and such that the former material is held in axial alignment to the shaft or journal being repaired; and means for clamping the brackets together such that the former material is wrapped around the shaft or journal, whereby repair material is molded to the damaged portion of the shaft or journal within the confines of the former material to define a repair portion of the shaft or journal which is of a size and alignment consistent with the undamaged portion of the shaft or journal, and then the repair apparatus is removed from the shaft or journal for subsequent use.

2. A repair apparatus to effect in situ repairs of a damaged portion of a bearing surface of a shaft or journal according to claim 1, wherein the flexible former material is a metal sheet.

3. A repair apparatus to effect in situ repairs of a damaged portion of a bearing surface of a shaft or journal according to claim 1, wherein the means for clamping the brackets together is a series of bolts positioned through the respective backs of the brackets such that the brackets are releasable connected by the bolts.

4. A repair apparatus to effect in situ repairs of a damaged portion of a bearing surface of a shaft or journal according to claim 1, wherein the flexible former material is provided with at least one small perforation therein, whereby repair material may be inserted into the flexible former material.

\* \* \* \* \*